United States Patent [19]

Nagao et al.

[11] Patent Number: 5,577,977
[45] Date of Patent: Nov. 26, 1996

[54] STARTER EQUIPPED WITH PLANETARY GEAR REDUCTION MECHANISM

[75] Inventors: Yasuhiro Nagao, Okazaki; Sadayoshi Kajino, Nagoya; Tsutomu Shiga, Nukata-gun, all of Japan

[73] Assignee: Nippondenso Co., Ltd., Kariya, Japan

[21] Appl. No.: 353,984

[22] Filed: Dec. 6, 1994

[30] Foreign Application Priority Data

Dec. 22, 1993 [JP] Japan .................... 5-323903

[51] Int. Cl.⁶ .................... F02N 15/02; F16H 57/08
[52] U.S. Cl. .................... 475/331; 74/7 E
[58] Field of Search .................... 74/6, 7 E; 475/317, 475/319, 331, 346, 348; 403/30, 361, 383, 345

[56] References Cited

U.S. PATENT DOCUMENTS

| | | | |
|---|---|---|---|
| 2,178,443 | 10/1939 | Wallace, Jr. | 475/331 |
| 2,212,321 | 8/1940 | Lacharite et al. | 475/331 |
| 3,154,970 | 11/1964 | Gebhardt et al. | 475/331 |
| 4,043,021 | 8/1977 | Mosbacher et al. | 475/331 X |
| 4,069,726 | 1/1978 | Garconnet | 475/317 |
| 4,573,364 | 3/1986 | Givan | 74/7 E |
| 4,860,604 | 8/1989 | Kinoshita | 74/7 E |
| 5,111,711 | 5/1992 | Engel et al. | 403/383 X |
| 5,292,292 | 3/1994 | Heirich et al. | 475/331 |
| 5,429,558 | 7/1995 | Lagarde | 475/331 X |

FOREIGN PATENT DOCUMENTS

| | | | |
|---|---|---|---|
| 448146 | 4/1948 | Canada | 403/383 |
| 59-121474 | 8/1984 | Japan . | |
| 1-69183 | 5/1989 | Japan . | |
| 4-32268 | 3/1992 | Japan . | |
| 1649134 | 5/1991 | U.S.S.R. | 403/383 |

*Primary Examiner*—Khoi Q. Ta
*Attorney, Agent, or Firm*—Cushman, Darby & Cushman

[57] ABSTRACT

A starter equipped with a planetary gear reduction mechanism, which allows a significant reduction in the inertial mass of the planetary gear shaft supporting member is disclosed. The invention includes a planetary gear shafts that are formed integral with the planetary gear shaft supporting member, which is inserted and secured on a drive shaft. Such a structure allows for the weight of the planetary gear shaft supporting member to be reduced significantly, and reduction in the inertial mass of the drive shaft is likewise achieved. Further, breakage of teeth of the pinion gear or the ring gear at repeated engagements of the rotating pinion gear is prevented. In addition, the planetary gear shaft supporting member and the planetary gear shafts are made by forming a metal plate and the planetary gear shafts can be manufactured easily by bending the plate or burring.

4 Claims, 4 Drawing Sheets

FIG. 6A  FIG. 6B
(a) 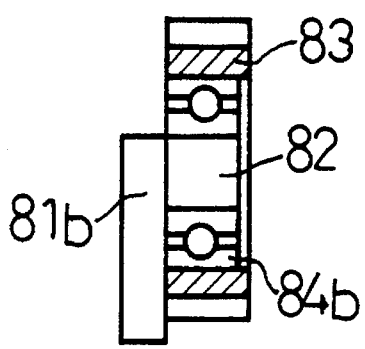
(b) 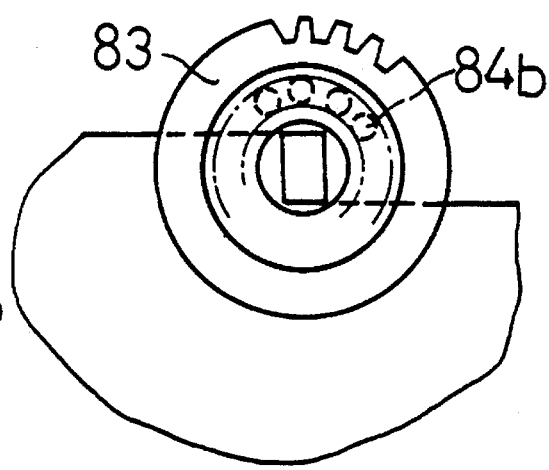
FIG. 7
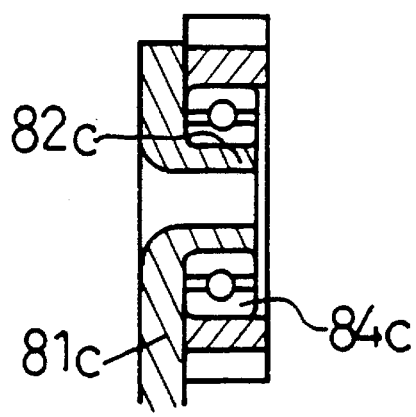

1

STARTER EQUIPPED WITH PLANETARY GEAR REDUCTION MECHANISM

CROSS REFERENCE TO RELATED APPLICATION

This application is based upon and claims priority from Japanese Patent Application No. 5-323903, filed Dec. 22, 1993, the contents of which are hereby incorporated herein by reference.

BACKGROUND OF THE INVENTION

1. Field of the Invention

The present invention relates to a starter for starting an internal combustion engine, the starter being equipped with a planetary gear reduction mechanism, as well as to the method of manufacturing the starter.

2. Related Art

In a conventional starter equipped with a planetary gear reduction mechanism, as disclosed in Japanese Utility Model Application Laid Open S59-121474, Japanese Utility Model Application Laid Open H1-69183, Japanese Utility Model Application Laid Open H4-32268, and Journal of Nippondenso Technical Disclosure 72-055, holes adapted for the insertion of the planetary gear shaft are bored in a planetary gear shaft supporting member, which is pre-manufactured integral with a drive shaft. The planetary gear shaft including a pin, i.e., a roller, and other elements is inserted in the holes in the supporting member by press-fitting or other methods.

According to such a method as associated with conventional starters having planetary gear reduction mechanism, however, as disclosed by Utility Model Laid Open H4-32268, it was necessary to increase the thickness of the planetary gear shaft supporting member in order to reinforce the bonding strength between the planetary gear shaft and the planetary gear shaft supporting member.

When the thickness of the planetary gear shaft supporting members is increased, the diameter of the planetary gear shaft supporting member is likewise increased, as is the inertial mass of the drive shaft. As a result of the increase in the size of the supporting member, the number of impacts at repeated engagements of a rotating pinion gear is also increased and teeth of both the pinion gear and a ring gear of an internal combustion engine may be broken, thus requiring increased maintenance.

Instead of increasing the thickness of the planetary gear shaft supporting member as described above, it has also been proposed that the bonding strength may be reinforced by heat treatment of the planetary gear shaft supporting member. However, despite such attempts, it is still necessary to considerably thicken the planetary gear supporting member.

Moreover, in order to integrate the drive shaft and the planetary gear shaft supporting member, hereinafter simply called "the supporting member", although the supporting member is formed conventionally by pressing and extending the drive shaft in a forging process, the problem existed that the forging process was complicated as it required a multiple number of forging steps and complications arose in that the diameter of supporting members was notably larger than that of the drive shaft.

The process is further complicated because, when press-fitting the planetary gear shafts into the supporting member, it is necessary to bore holes for a plurality, e.g., three pieces, of planetary gear shafts on the supporting member, to remove burrs and to press-fit these shafts.

SUMMARY OF THE INVENTION

The present invention has been accomplished in an attempt to solve the problems mentioned above and has as its primary object the provision of a starter equipped with a planetary gear reduction mechanism, which allows reducing the mass of the planetary gear shaft supporting member.

A second object of the present invention is to provide a manufacturing method of a starter equipped with a planetary gear reduction mechanism that simplifies the manufacture of the planetary gear shaft supporting member and planetary gear shafts.

A starter equipped with a planetary gear reduction mechanism according to the present invention includes a sun gear which is provided around the external periphery of one end of a starter motor armature shaft. A drive shaft is supported by a housing along the same axial center of the armature shaft in a manner allowing free rotation thereof. At the same time, one end of the drive shaft is disposed close to one end of the armature shaft. A pinion gear is installed on the drive shaft in such a manner that free relative rotation of the pinion gear and also free sliding of the pinion gear in an axial direction are allowed. A planetary gear shaft supporting member is provided that has a planetary gear shafts protruding in parallel with the drive shaft toward the sun gear. The planetary gear shaft supporting member is inserted and secured to one end of the drive shaft. A planetary gears are supported by the planetary gear shaft in such a manner as to allow free rotation thereof and is adapted to engage the sun gear. An internal gear is secured or combined via friction to the housing and, at the same time, engages with the planetary gears. In the present invention, the planetary gear shafts are formed to be integral with the planetary gear shaft supporting member. In a preferred embodiment, the planetary gear shafts have a square cross section.

A method to manufacture a starter equipped with a planetary gear reduction mechanism according to the present invention includes the steps of providing a sun gear around an external periphery of one end of an armature shaft of a starter motor, supporting a drive shaft by a housing along the same axial center of the armature shaft in a manner so as to allow free rotation of the drive shaft with one end of the drive shaft being proximate to one end of the armature shaft, installing a pinion gear on the drive shaft in a manner that allows free relative rotation of the pinion gear and also free sliding movement in the axial direction, inserting a planetary gear shaft support member, which has planetary gear shafts protruding in parallel with the drive shaft toward the sun gear, on one end of the drive shaft and securing the planetary gear support member thereto, supporting planetary gears by the planetary gear shafts in a manner that allows free rotation of the planetary gears and engages the planetary gears with the sun gear, and securing or combining an internal gear with friction to the housing and, at the same time, engaging the planetary gears. In the method according to the present invention the planetary gear shaft supporting member and the planetary gear shafts are manufactured integrally by forming a metal plate. In a preferred embodiment, the metal plate is folded and bent to manufacture the planetary gear shafts.

In a more preferred embodiment, the metal plate is processed with burring to manufacture the planetary gear shafts.

In the starter according to the present invention, the planetary gear shafts are formed integral with the planetary gear shaft supporting member, which is inserted and secured on the drive shaft. By structuring the starter as described above, the following operation and effect will be obtained.

First, since the present invention allows significant reductions in the weight of the planetary gear shaft supporting member, the inertial mass of the drive shaft is reduced so that breakage of teeth of the pinion gear or ring gear at the repeated engagement of rotating pinion gear can be prevented.

In addition, since the planetary gear shaft supporting member is made thin, its elastic deformation can be enlarged so that impacts generating from the engagement of the pinion gear can be alleviated.

In the manufacturing method for the starter according to the present invention, the planetary gear shaft supporting member and the planetary gear shafts are formed with a metal plate by press working. By so doing, the manufacture of planetary gear shaft supporting member and the planetary gear shafts are considerably simplified compared with the conventional method.

In other words, the forging of multiple steps which was necessary in the conventional method is now unnecessary and such processes as boring on the supporting member and manufacture and press-fitting of the planetary gear shafts are not required.

BRIEF DESCRIPTION OF THE DRAWINGS

These and other objects, features and characteristics of the present invention will become apparent to a person of ordinary skill in the art from a study of the following detailed description in combination with the appended claims and drawings, all of which form a part of this application. In the accompanying drawings:

FIGS. 6A and 6B are enlarged sectional view and a front elevation of the fourth embodiment of the present invention;

FIG. 7 is an enlarged sectional view of the fifth embodiment of the present invention;

DETAILED DESCRIPTION OF THE PRESENTLY PREFERRED EXEMPLARY EMBODIMENTS

Figure 1:
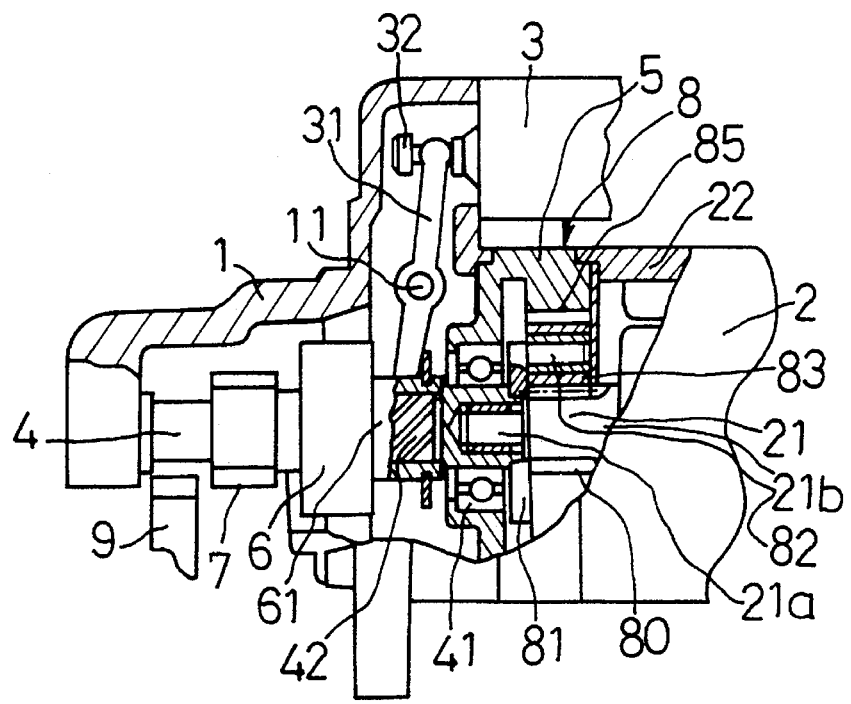
FIG. 1 is a partial cross-sectional view of the first embodiment of a starter equipped with a planetary gear reduction mechanism according to the present invention.

FIG. 1 shows the first embodiment of a starter equipped with a planetary gear reduction mechanism according to the present invention.

At the right end of housing 1, starter motor 2 is secured by through bolts (not shown) via center case 5 and magnet switch 3 is secured to housing 1, i.e., the housing according to the present invention, above and adjacent to starter motor 2.

Right end section of armature shaft 21 on starter motor 2 is supported by an end bracket (not shown) of starter motor 2. Part 22 is a case which also serves as a yoke of starter motor 2. The left end section of the armature shaft 21, i.e., the rotary shaft of starter motor 2, has a large diameter section 21b of which sun gear 80 is formed on the outer periphery, and small diameter section 21a which further protrudes axially from large diameter section 21b. Small diameter section 21a is inserted in a recess at the right end of drive shaft 4 and supported by shaft 4, via a cylindrical bearing, in a manner that allows free relative rotation therebetween.

Drive shaft 4 extends leftward in the figure along the same axial center as armature shaft 21 and its left end is supported by the housing 1 via a bearing (not shown) while its right end is supported by the center case (or a housing according to the present invention) via bearing 41.

At the periphery around the axial center of drive shaft 4, helical spline slot 42 is provided and spline cylinder 61 of one-way clutch 6 engages in slot 42. On the other hand, the one-way clutch 6 has, as known in the art, an external peripheral member, a clutch outer member, and an internal peripheral member, a clutch inner, and, on the surface of internal periphery of the clutch outer, a recessed roller chamber which accommodates a clutch roller and a clutch spring, is provided. The spline cylinder 61 is formed integrally with either one of the clutch outer member or the clutch inner member while the remaining clutch outer member or inner member is formed integrally with pinion gear 7. One-way clutch 6 and pinion gear 7 are inserted on drive shaft 4 in a manner such that free relative rotation of the pinion gear 7 as well as free sliding in the axial direction are allowed.

Shift lever 31 is attached to support pin 11, which is supported by housing 1. One end of shift lever 31 is connected to the periphery of spline cylinder 61 so as to move one-way clutch 6 axially forward or backward, integrally with pinion gear 7 so that pinion gear 7 is engaged with and disengaged from an engine ring gear 9. The other end of shift lever 31 connects to plunger shaft 32, which extends from the plunger of magnet switch 3 so that it is moved pivotally by the plunger shaft 32.

The planetary gear reduction mechanism according to the first embodiment will be described in more detail hereinunder.

Planetary gear reduction mechanism 8 includes a sun gear 80, planetary gears 83 and internal gear 85. At right end of drive shaft 4, the planetary gear shaft supporting member 81 made of a plate is provided and planetary gears 83 that are inserted on a plural number of planetary gear shafts 82 which protrude from rear (right) end face of planetary gear shaft supporting member 81 in parallel with the drive shaft 4, in a manner allowing free rotation.

These planetary gears 83, at their smaller diameter side or at the side of armature shaft 21, engage with the sun gear 80 while, at their larger diameter side or at the side of housing 2, engage with the internal teeth of internal gear 85 provided on the surface of internal periphery at rear end of center case 5. Center case 5 is a cylinder which is closed at this end but open at the rear and has a gear chamber which accommodates the planetary gear reduction mechanism 8. The open rear end of center case 5 is shut off with a wall plate from the motor 2.

Figures 2A, 2B:
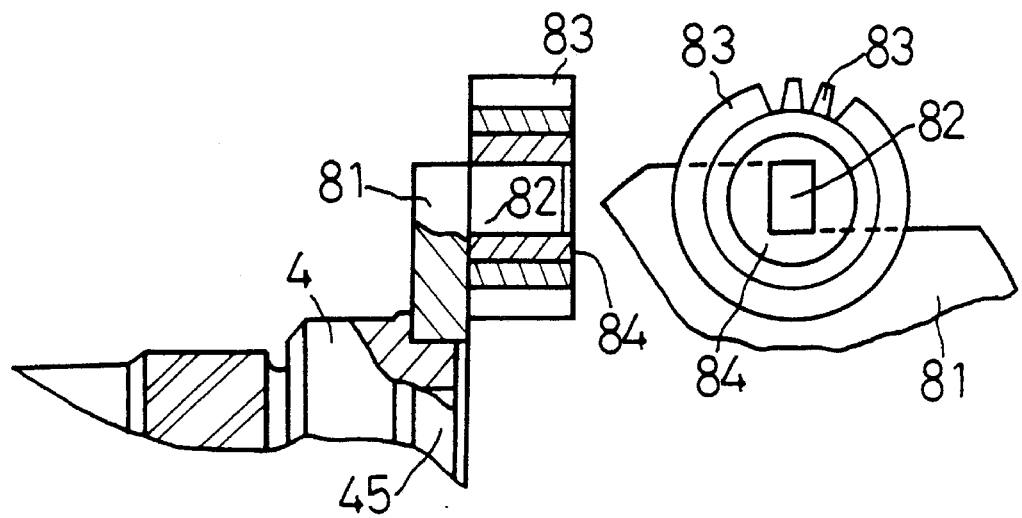
FIG. 2A is an enlarged sectional view of a major section of FIG. 1.
FIG. 2B is a front elevation seen from the left side in FIG. 1.
Figure 3A:
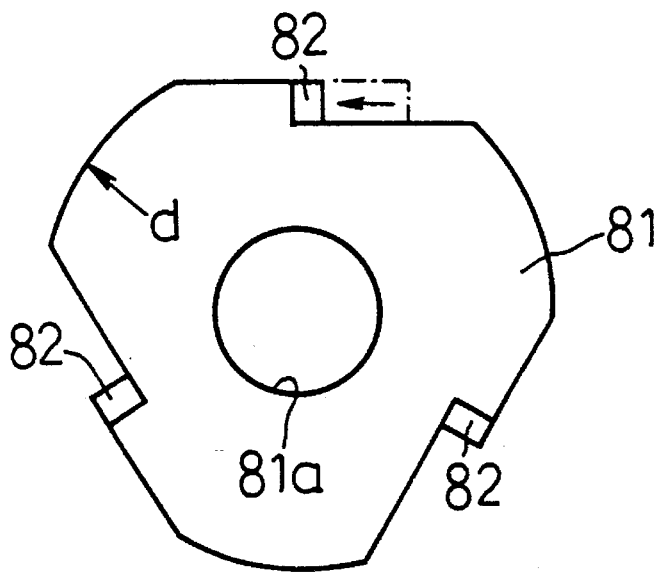
FIG. 3A is a front elevation seen from the left in FIG. 1 and FIG. 3B a side elevation thereof.
Figure 3B:
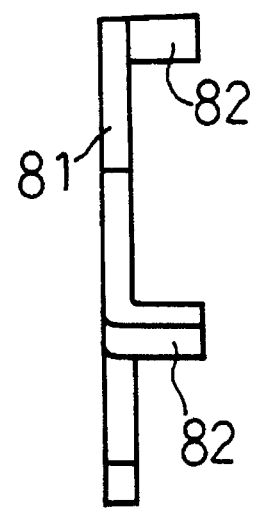

Referring to FIG. 2, which shows an enlarged side cross section, and FIGS. 3A and 3B, which show an enlarged front elevation seen from the front direction (from left side in FIG. 1) a side elevation, the planetary gear shaft supporting member 81 and the planetary gear shafts 82 are explained.

Planetary gear shaft supporting member 81, "supporting member", is as shown by FIGS. 3A and 3B formed with a generally disc-shaped plate material of low carbon steel which is about 4 mm in thickness, by the press working. It is bent at one place or a plural number of places, e.g., three, on its external periphery by press working to produce the planetary gear shafts 82. Accordingly, in this embodiment, the cross section in the peripheral direction of planetary gear shafts 82 forms a square as shown by FIG. 2B. each of planetary gear shafts 82 is 8 mm in length and the diameter of supporting member 81 is 44 mm in this embodiment.

On the other hand, smaller diameter section 45 is provided at the right end of drive shaft 4 and section 45 is installed in center hole 81a of supporting member 81 by press-fitting.

In order to enhance the bonding strength between the supporting member 81 and drive shaft 4, other bonding methods, such as welding, press-fitting, brazing, etc. may be employed.

Further, the smaller diameter section 45 of drive shaft 4 and center hole 81a of supporting member 81 may be made in square shape and a slot and a ledge to engage in the slot may be provided.

Therefore, the center hole of bearing bushing 84 which is an oil-less bushing, is made in a square in line with the shape of square planetary gear shafts so as to be inserted on planetary gear shaft 82. Material and dimensions of the planetary gear shaft supporting member 81 mentioned above are only one example and it is apparent that any other design may be employed.

Next, the operation of the starter described above is presented.

As magnet switch 3 is energized, lever 31 moves pivotally and causes one-way clutch 6 and pinion gear 7 to move forward. Just before pinion gear 7 crushes on ring gear 9, the contact of magnet switch 3 closes and the current flows through and operates the starter motor 2.

Rotating torque of armature shaft 21 is conducted via the sun gear 80 and reduced in rotation speed through planetary gears 83, drive shaft 4, spline 61, with one-way clutch 6, pinion gear 7 and ring gear 9 before being transmitted to an internal combustion engine (not shown). Spline cylinder 61 receives a forward thrust from helical spline slot 42 by the turn of drive shaft 4 and urges the forward motions of one-way clutch 6 and pinion gear 7.

When the current to the magnet switch 3 and starter motor 2 is shut down, one-way clutch 6 and pinion gear 7 retreat by the return movement of lever 31 and thus the starter stops.

Next, the operation and effect of supporting member 81 and planetary gear shafts 82 according to this embodiment are described.

First of all, since the supporting member 81 is formed with a plate material by press working and besides planetary gear shafts 82 and supporting member 81 are formed as an integral component by bending the radially outermost periphery, it is not necessary to employ thick supporting member 81 as in the case of conventional pin press-fitting methods and, since this allows reductions in the inertial mass of drive shaft 4 due to a lighter supporting member 81, impacts by engagement exerted on the pinion gear 7 can be alleviated. Impacts on the pinion gear 7 by engagement can be further reduced owing to elastic deformation of supporting member 81 and planetary gear shafts 82 of which the thickness has been reduced. As a result of these effects, the breakage of teeth of pinion gear 7 and ring gear 9 at the repeated engagement of pinion gear 7 can be prevented.

In addition, the operation is simplified very much and number of requisite parts also can be reduced. Moreover, since the planetary gear shafts 82 and the center hole of bearing bushing 84 are shaped in square, the working of planetary gear shafts 82 becomes easier. Since the operation of sliding surface of bushing 84 is limited to the surface of the external periphery, it becomes possible to allow enlargements in the size of the sliding surface. Thus, the size of bushing 84 can be reduced as a result of a smaller number of bearings on bushing 84.

Because there is no auto-rotation with bearing bushing 84, oil splashing from bushing 84 is eliminated resulting in an extended life of bushing. It is known that, with conventional methods, lubricant was apt to be in short supply on the sliding surface of internal periphery because oil was splashed outward by the centrifugal force caused by the auto-rotation of bushing 84.

Figure 4:
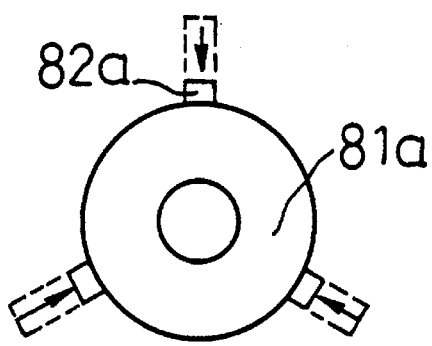
FIG. 4 is a front elevation of the second embodiment of the present invention.

In the second embodiment shown in FIG. 4, claws 100 which are extending in a radial direction from the surface of external periphery of supporting member 81a, are bent to form planetary gear shafts 82a.

Figure 5:
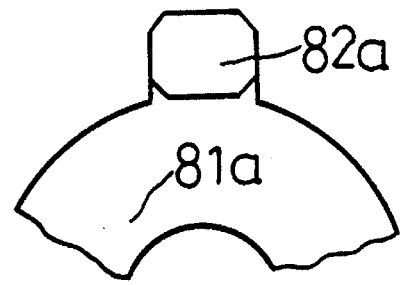
FIG. 5 is a front elevation of the third embodiment of the present invention.

In the third embodiment shown in FIG. 5, planetary gear shafts 82a which are formed in the same manner as in the foregoing embodiment of FIG. 4, but the rectangular corners of the planetary gear shafts are chamfered. In other words, planetary gear shafts 82a may take a shape other than square.

In the fourth embodiment shown in FIGS. 6A and 6B, ball bearings 84b are used instead of oil-less bushing on the square planetary gear shafts 82 which are integral with supporting member 81b. It is apparent that there is no problem even if needle bearings are employed instead.

In the fifth embodiment shown in FIG. 7, the supporting member 81c made of plate material is worked with burring to form planetary gear shafts 82c and ball bearings 84c are press-fit thereon. The burring may be done simultaneously to the press forming of supporting member 81c.

Figure 8:
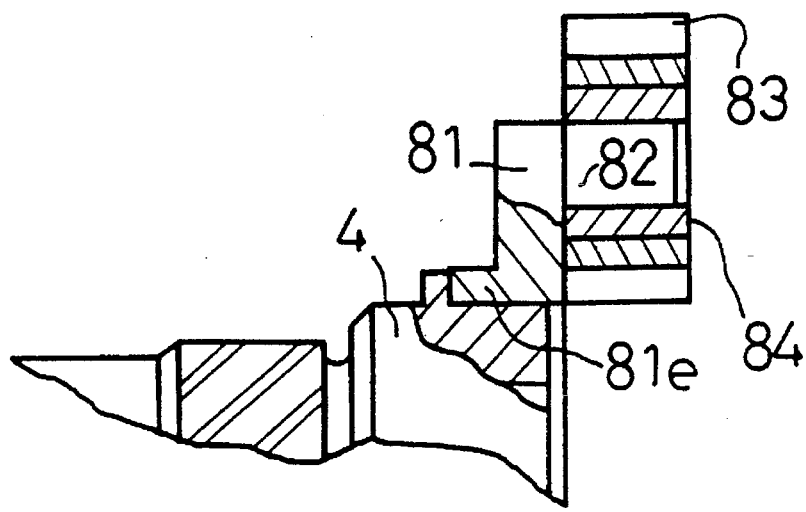
FIG. 8 is an enlarged sectional view of the sixth embodiment of the present invention.

In the sixth embodiment shown in FIG. 8, supporting member 81 made of plate material is worked with the burring to form central cylinder 81e and drive shaft 4 is press-fit in central cylinder 81e. In place of burring, the area contacting with drive shaft 4 may be enlarged by bending a plural number of claws in the forward direction.

Figure 9:
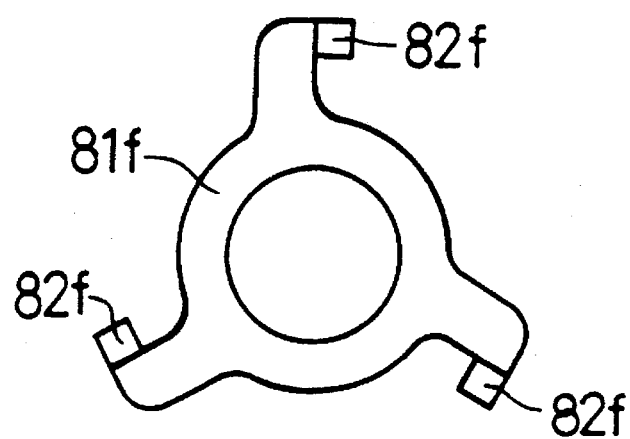
FIG. 9 is a front elevation of the seventh embodiment of the present invention.

In the seventh embodiment shown in FIG. 9, supporting member 81f is disposed to be susceptible to elastic deformation in the peripheral direction by reducing the average outside diameter of supporting member 81f so that impacts by engagement can be absorbed more effectively by the elastic deformation in the peripheral direction of supporting member 81f. In this embodiment, planetary gear shafts 82f are formed by bending the radial outermost portion of the supporting member 81f.

This invention has been descried in connection with what are currently considered to be the most practical and preferred embodiments of the present invention. However, this invention is not to be limited to the disclosed embodiments, but rather is intended to cover all modifications and equivalent arrangements included within the spirit and scope of the appended claims.

What is claimed is:

1. A starter equipped with a planetary gear reduction mechanism comprising:

a housing;

a sun gear provided around an external periphery of one end of an armature shaft of a starter motor;

a drive shaft supported rotatably in said housing along the same axial center as said armature shaft, one end of said drive shaft being disposed proximate to said one end of said armature shaft;

a pinion gear installed rotatably and axially slidably on said drive shaft;

a planetary gear shaft support member having planetary gear shafts protruding in parallel with said armature shaft, said planetary gear support member being inserted and secured on said one end of said drive shaft;

planetary gears supported rotatably by said planetary gear shafts in engagement with said sun gear; and an internal gear fixed to said housing and engaged with said planetary gears, wherein said planetary gear shafts have a generally square cross section and are formed integrally with said planetary gear shaft support member, wherein bushings are interposed between the planetary gear shafts and the planetary gears and each of the bushings has a generally rectangular hole fixedly inserted onto the corresponding one of the planetary gear shafts and a circular outer circumference supporting a corresponding one of the planetary gears slidably thereon for sliding rotation of the planetary gear around the bushing.

2. A starter for an engine having a ring gear, comprising:

a starter motor having a rotary shaft formed with a sun gear thereon;

a drive shaft having thereon a pinion gear engagable with said ring gear; and a gear mechanism operatively coupled with said starter motor and said drive shaft for transmitting rotation of said starter motor to said drive shaft, said mechanism including a generally disc-shaped member which is coaxially coupled with said drive shaft and has a plurality of protrusions integrally extending axially from a substantially outermost periphery of said member for rotatably supporting planetary gears thereon, for engagement with said sun gear, wherein said protrusions are formed by bending said outermost periphery of said member and have rectangular shape in cross section, wherein cylindrical members are interposed between the protrusions and the planetary gears, and each of the cylindrical members has a rectangular hole fixedly inserted onto a corresponding one of the protrusions and a cylindrical outer surface supporting a corresponding one of the planetary gears slidably thereon.

3. A starter equipped with a planetary gear reduction mechanism comprising:

a housing;

a starter motor including an armature shaft formed with a sun gear thereon at one end thereof;

a drive shaft supported rotatably in said housing coaxially with said armature shaft, one end of said drive shaft being disposed proximate to said one end of said armature shaft;

a pinion gear installed rotatably and axially slidably on said drive shaft;

a planetary gear shaft support member having planetary gear shafts protruding in parallel with said armature shaft, said planetary gear shift support member being secured on said one end of said drive shaft;

planetary gears supported rotatably by said planetary gear shafts for engagement with said sun gear; and an internal gear fixed to said housing and engaged with said planetary gears, wherein said planetary gear shafts have a generally square cross section, and wherein cylindrical members are interposed between the planetary gear shafts and the planetary gears, and each of the cylindrical members has a square hole to be fixedly inserted onto a corresponding one of the planetary gear shafts and a cylindrical outer surface supporting a corresponding one of the planetary gears slidably thereon.

4. A starter according to claim 3, wherein said planetary gear shaft support member is bent at a plurality of substantially radially outermost portions thereof to provide said planetary gear shafts.

* * * * *